W. ZSCHOKKE.
OBJECTIVE.
APPLICATION FILED JULY 1, 1908.
912,352.
Patented Feb. 16, 1909.
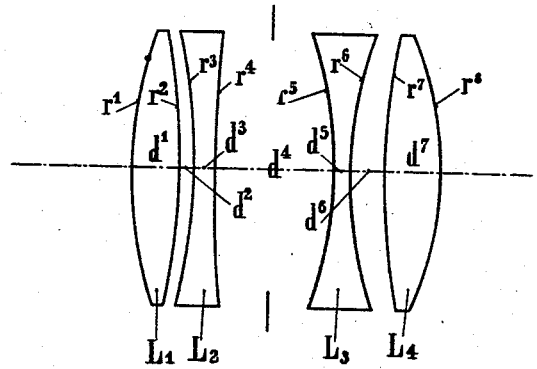
Witnesses:
E. O. Hildebrand
M. B. Taylor.
Inventor:
Walther Zschokke,
by Georgi & Massie
Attorneys

UNITED STATES PATENT OFFICE.

WALTHER ZSCHOKKE, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

OBJECTIVE.

No. 912,352.   Specification of Letters Patent.   Patented Feb. 16, 1909.

Application filed July 1, 1908.   Serial No. 441,344.

*To all whom it may concern:*

Be it known that I, WALTHER ZSCHOKKE, engineer, a citizen of Switzerland, residing at 1 Belfortstrasse, Steglitz, near Berlin, Germany, have invented certain new and useful Improvements in and Relating to Objectives, of which the following is a specification.

This invention relates to four lens objectives built up from two pairs of lenses, each comprising a positive and a negative lens leaving between them an air space in the form of a positive meniscus and consists more particularly in the construction of an objective showing also in connection with great effective area or opening a very good state of correction especially with respect to chromatic and spherical aberration. To accomplish this effect the refractive power of the negative lens in each of the two pairs of lenses is made smaller or equal to the refractive power of the positive in the pairs of lenses respectively and at the same time the focal length of one half of the objective formed by one of the two pairs of lenses is made at least twice as great as the focal length of the other half. By such construction of the objective from two halves, each of which showing if examined for itself alone considerable aberrations, it becomes possible to compensate the aberrations of the halves and to obtain an objective of heightened perfection as compared with known objectives of the kind referred to.

An objective in accordance with this invention is represented on the accompanying drawing, where the two lenses forming the one half of the objective are designated $L_1$ $L_2$, the lenses of the other half $L_3$, $L_4$. The thicknesses of the lenses and air spaces between same are: $d_1$, $d_2$, $d_3$, $d_4$, $d_5$, $d_6$ and $d_7$. The surfaces of the lenses are designated $r_1$, $r_2$, $r_3$, $r_4$, $r_5$, $r_6$, $r_7$ and $r_8$; the same reference letters may be used hereafter for the radii of curvature of said surfaces.

The constructional elements of an embodiment of the new objective for a focal length or distance of $f = 100$ are given in the following table:

| Radii. | Thicknesses. | | Kinds of glass. | | |
|---|---|---|---|---|---|
| $r_1 = + 43.478$ | $d_1 = 5.2$ | $D_n = 1.6141$ | $G'_n = 1.6280$ | $C - F = 0.01088$ |
| $r_2 = - 70.423$ | $d_2 = 1.6$ | | | |
| $r_3 = - 55.866$ | $d_3 = 2.1$ | $D_n = 1.6051$ | $G'_n = 1.6260$ | " $= 0.01586$ |
| $r_4 = +163.934$ | $d_4 = 12.0$ | | | |
| $r_5 = - 41.667$ | $d_5 = 1.8$ | $D_n = 1.5513$ | $G'_n = 1.5672$ | " $= 0.01220$ |
| $r_6 = + 41.667$ | $d_6 = 3.6$ | | | |
| $r_7 = + 78.126$ | $d_7 = 5.7$ | $D_n = 1.6141$ | $G'_n = 1.6280$ | " $= 0,01088$ |
| $r_8 = - 34.439$ | | | | |

Effective area or opening 1 : 3.5.

What I claim as my invention and desire to secure by Letters Patent of the United States is:

A four lens objective built up of two uncorrected halves, each comprising a positive and a negative lens, said lenses being separated from each other by an air space having the form of a positive meniscus, the refractive power of the negative lens being in each half not greater than the refractive power of the positive lens and the focal length of one half being at least double the focal length of the second half.

In testimony whereof I hereunto affix my signature in the presence of two witnesses.

WALTHER ZSCHOKKE.

Witnesses:
WOLDEMAR HAUPT,
HENRY HASPER.